United States Patent [19]

Saizon

[11] 4,107,819
[45] Aug. 22, 1978

[54] HAND-HELD, ELECTRICALLY OPERATED FISH SCALER

[76] Inventor: Floyd S. Saizon, 8880 Darby Dr., Baton Rouge, La. 70896

[21] Appl. No.: 755,960

[22] Filed: Jan. 3, 1977

[51] Int. Cl.² ........................................... A22C 25/02
[52] U.S. Cl. ........................................... 17/64; 17/67
[58] Field of Search .................................. 17/66–69, 17/18, 64; 99/593, 541; 15/93 R, 236 B

[56] References Cited

U.S. PATENT DOCUMENTS

| | | | |
|---|---|---|---|
| 1,000,073 | 8/1911 | Clarke | 17/69 |
| 1,236,369 | 8/1917 | Easby et al. | 17/66 |
| 1,642,802 | 9/1927 | Barry | 17/67 |
| 1,758,675 | 5/1930 | Reilly | 17/67 |
| 2,154,187 | 4/1939 | Scouille | 17/67 |
| 2,310,626 | 2/1943 | Gold | 17/64 |
| 2,481,182 | 9/1949 | Waters | 17/67 |
| 2,557,272 | 6/1931 | Gabriel | 17/67 |
| 2,598,509 | 5/1952 | Corbin | 17/67 |
| 2,655,689 | 10/1952 | Witte | 17/67 |
| 2,835,919 | 5/1958 | Colburn et al. | 17/67 |
| 3,016,564 | 1/1962 | Soulier | 17/67 |
| 3,072,956 | 1/1963 | Olrich | 17/67 |
| 3,303,563 | 2/1967 | Peterson | 17/66 |
| 3,328,834 | 7/1967 | Pulcifer | 17/67 |
| 3,378,869 | 4/1968 | Schwartz | 15/93 R |
| 3,590,424 | 7/1971 | Shults | 17/67 |
| 3,869,755 | 3/1975 | Stauft | 17/25 |
| 3,872,544 | 3/1975 | Lange | 17/64 |

FOREIGN PATENT DOCUMENTS

| | | | |
|---|---|---|---|
| 702,013 | 1/1965 | Canada | 17/64 |
| 384,166 | 1/1965 | Switzerland | 17/67 |

*Primary Examiner*—Louis G. Mancene
*Assistant Examiner*—Paul J. Hirsch
*Attorney, Agent, or Firm*—Arnold, White & Durkee

[57] ABSTRACT

A hand-held, electrically operated fish scaler includes a motor driven descaling tool which defines teeth having scraping edges especially arranged with respect to one another and to the axis of the descaling tool. The descaling tool includes a shank which is removably secured to the motor for rotation about the axis of the shank, and a member secured to the shank for defining the teeth and the scraping edges. In one embodiment the teeth are arranged with respect to one another to provide a periphery of an oval shape along at least a portion of the axis. In another embodiment the teeth, which are defined by a front wall, a rear wall, and a pair of side walls, have the respective front walls lying in non-radial planes with respect to the axis, thereby providing either a positive or a negative rake. Preferably the motor is a relatively high speed motor, and a speed reducer is provided for enabling the descaling tool to rotate at a slower speed than that of the motor.

1 Claim, 11 Drawing Figures

HAND-HELD, ELECTRICALLY OPERATED FISH SCALER

BACKGROUND OF THE INVENTION

This invention relates generally to power operated, rotary fish scalers, and more particularly relates to such fish scalers particularly adapted for portable, hand-held usage and constructed for battery operation.

The descaling of fish has been a nuisance for about as long as there have been fisherman. It is thus not surprising that many methods for facilitating the descaling of fish have been proposed.

Various proposals have suggested descaling methods using motor driven rotary members which manually remove the scales by abrasion or scraping. These methods have included use of a tool which would provide elongate edges formed by ridges radially extending from a tubular member. The member was to be rotated at speeds approximately 1200 to 1400 r.p.m. to cause the edges to scrape against the scales of the fish.

Other proposed methods have included use of a descaling tool which provided circumferential rows of cutting teeth about the rotary axis of the tool. The tool was adapted to be inserted into an electric drill for effecting rotation of the teeth about the axis and against the fish.

Still another proposed method suggested use of a cylindrical member having holes radially drilled through the member for providing the scraping edges. The member was to be inserted into an electric drill for rotation of the edges against the fish.

The methods and devices heretofore proposed by the prior art have generally not been adapted for high volume, economical production. Electrically operated drills usually are relatively low speed, high torque motors which are not only relatively expensive, but also are relatively heavy, tending to be awkward and tiresome to the operator during use. Furthermore, use of other than battery operated drills poses a safety problem due to the wet environment in which the tool was to be utilized. It is believed that the use of electric drills and the like for rotating the descaling tools has resulted from a lack of recognition of the prior art that the descaling tool could be coupled to the source of rotary power using a speed reducer, thereby allowing a relatively high speed, low torque motor to rotate the tool at lesser speeds.

Known prior art descaling tools also have been suggested which use cylindrically arranged teeth or ridges equidistantly positioned from an axis of rotation. The teeth of these tools define circles when rotated during operation. Although such a design provides a relatively large surface area for engaging the scales of the fish, it has been at the sacrifice of requiring a source of proportionately greater horsepower. Furthermore, such a cylindrical design, unless the diameter of the cylinder is sufficiently small, appears to offer little facility for scraping the scales out of relatively inaccessible regions on the fish, such as near the fins and on the underbody.

Still further, the known prior art devices appear not to have addressed themselves to the problem of flying scales during the removal process. Occasionally the removed scales annoyingly fly into the person of the user. One proposal has suggested controlling the distance to which the removed scales are scattered by controlling the rotational speed of the descaling too. This solution, however, appears not to be entirely satisfactory from preventing scales from flying into the person of the user.

SUMMARY OF THE INVENTION

The above noted and other drawbacks of the prior art are overcome by the present invention. A tool is provided which defines teeth having cutting edges especially arranged with respect to one another. By providing the descaling tool with teeth having scraping edges arranged to provide a periphery of an oval shape along the axis of the descaling tool, less horsepower is required during operation of the fish scaler. To provide a lighter more portable unit, a speed reducer is coupled between the descaling tool and the drive motor. This allows a relatively high speed, low torque, light weight motor to be utilized for providing the required horsepower. The high speed motor/speed reducer combination enables the descaling tool to operate within the desired speed range, yet provides a safer tool because of the less electrical current required to operate the low torque motor.

According to one feature of the invention, the hand-held, electrically operated fish scaler includes an electrical source of power for providing rotary motion and a descaling tool rotated for engaging the scales of the fish. The descaling tool includes a shank removably secured to the source for rotation about the axis of the shank. The descaling tool also includes a teeth defining member secured to the shank. The teeth defining member provides rows of teeth disposed circumferentially of the axis such that the teeth define scraping edges, arranged with respect to one another and to the axis, to provide an oval shaped periphery along at least a portion of the axis. The oval periphery of the scaping edges enables efficient descaling on generally less accessible surface regions of the fish, such as around the fins and underbody.

According to another aspect of the invention, each of the teeth is defined by a front wall, a rear wall, and a pair of side walls. To provide either a negative or a positive rake, the front walls of the teeth lie in nonradial planes with respect to the axis, thereby providing control over the degree of abrasion per revolution of the descaling tool.

According to another feature of the invention, a relatively high speed, light weight motor is utilized for rotating the descaling too. A speed reducer is connected between the shank of the descaling tool and the motor to enable the teeth defining member to be rotated at a speed less than the rotational speed of the motor. Use of such a speed reducer allows usage of the high speed motor, thereby providing a lighter weight and safer unit than if a lower speed, higher torque motor was utilized to directly rotate the teeth defining member at the desired rotational speed. Preferably, the rotational speed of the teeth defining member is a surface speed within the range of 3600-4800 inches per minute.

According to other features of the invention, a housing is provided for the motor. The housing defines an opening for receiving the shank of the teeth defining member. A bearing structure is provided within the opening for supporting the shank and for providing a seal between the housing and the shank. Further, a substantially transparent shield is secured to the housing and disposed overlying the teeth defining member for deflecting scales during operation of the fish scaler. As a feature which prevents inadvertent activation of the motor, a manually actuable motor energizing switch is counter-sunk into the housing.

According to still another feature of the invention, the teeth defining member is comprised of a material which provides a hardened edge surface. Preferably the hardened edge surface is of anodized aluminum. Such a material not only provides relatively long life to the scraping edges, but provides a descaling tool of relatively light weight.

It is therefore a general object of the present invention to provide a new and improved hand-held, rotary fish scaler which is particularly adapted for high volume and economical manufacture, yet which provides efficient and safe descaling of fish.

Other objects and features of the present invention will become apparent from a reading of the description of a preferred embodiment in conjunction with a set of drawings; wherein.

BRIEF DESCRIPTION OF A PREFERRED EMBODIMENT

Figure 1:
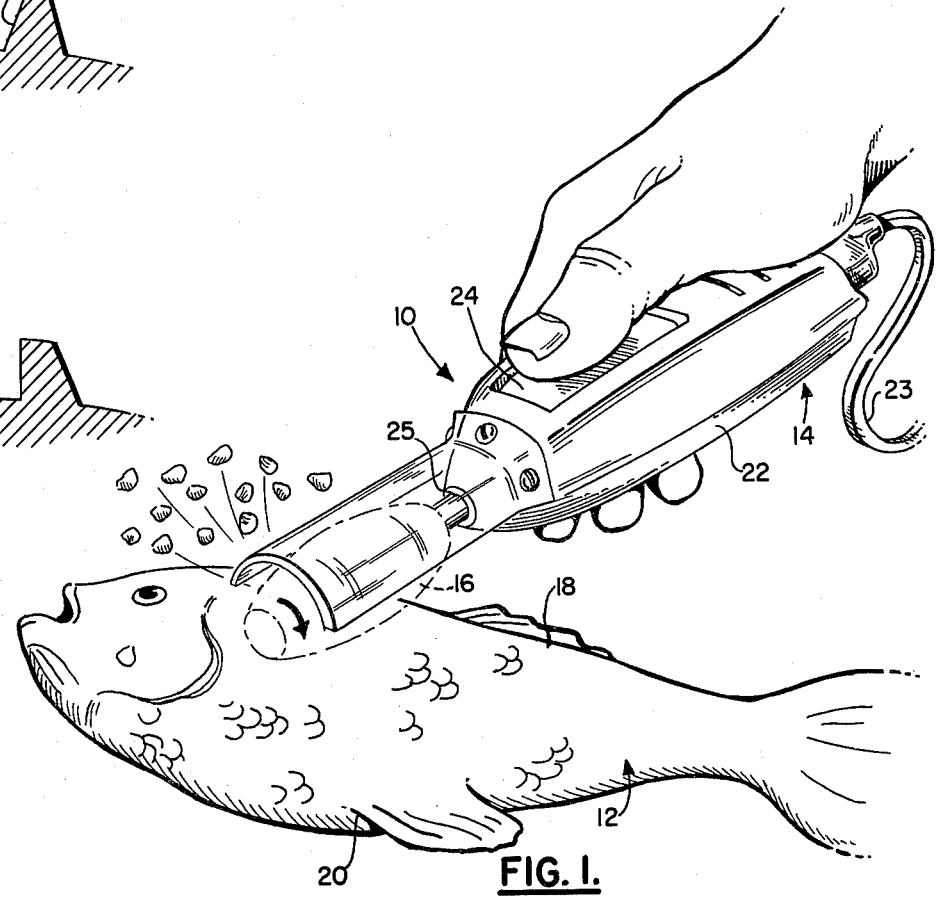
FIG. 1 is a perspective view of operation of a rotary, hand-held fish scaler according to one embodiment of the invention.
Figure 10:
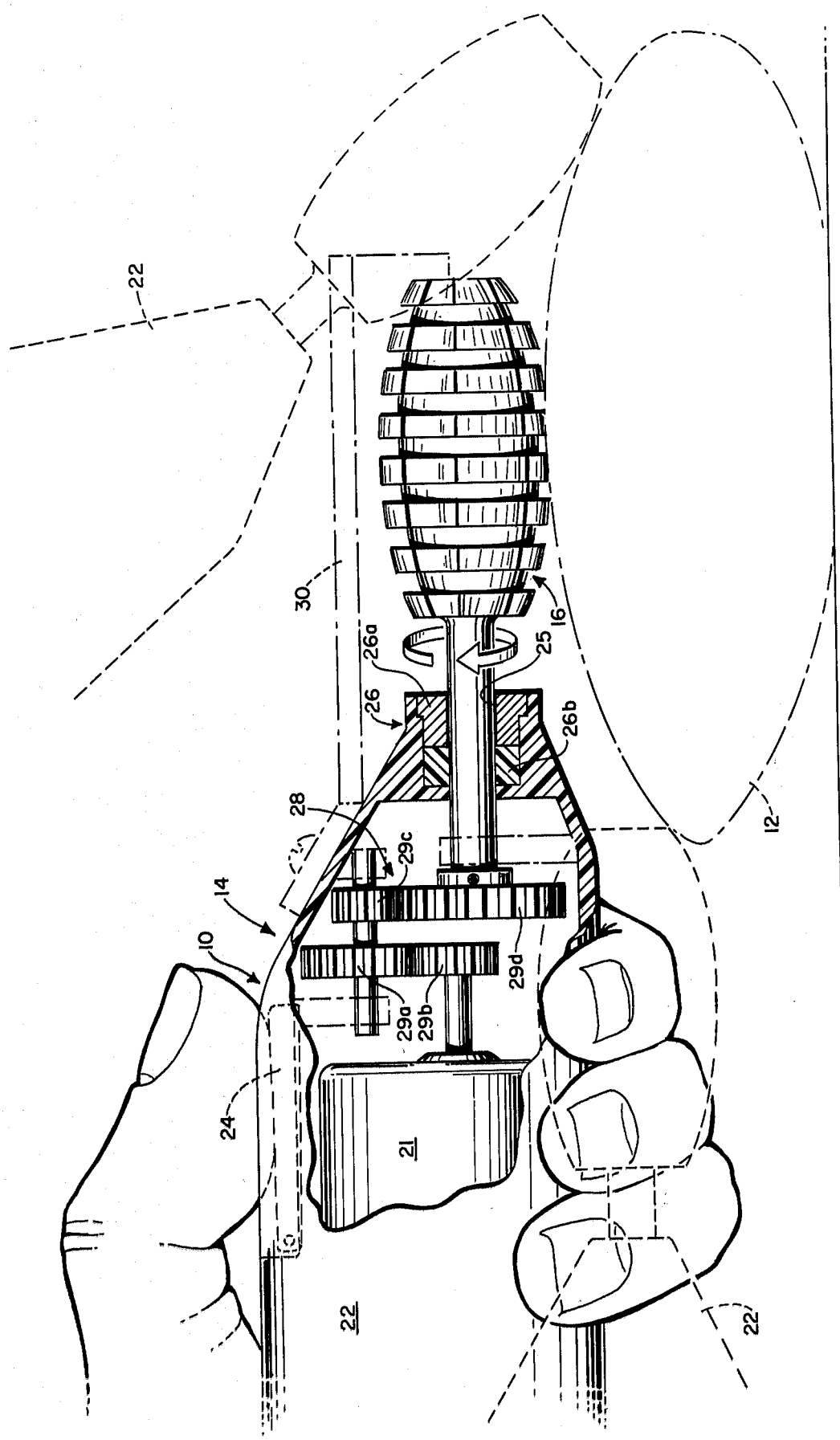
FIG. 10 is a cut away, partial schematic view of operation of a fish scaler according to an embodiment of the invention.

Referring now to FIGS. 1 and 10, a fish scaler 10 is shown during operation for removing scales from a fish 12. The fish scaler 10 includes an electrical source of power 14 and a descaling tool 16 coupled to the source of power 14 for rotary movement. The descaling tool 16 defines teeth which provide cutting or scaping edges. According to an outstanding feature of the invention the teeth are especially arranged with respect to one another such that the cutting or scraping edges provide a periphery of an oval shape along at least a portion of the descaling tool. The oval shape facilitates removing scales in otherwise relatively inaccessible regions on the fish such as regions 18 around the fins, and regions 20 on the underside of the fish. The schematic illustrations in phanton outline in FIG. 10 show various operational orientations of the tool 16.

The source of power 14 preferably includes a high speed motor 21 which is supported within a housing 22. The motor 21 is a relatively high speed, low torque motor commercially available from General Electric and Toastmaster Division of McGraw-Edison. It develops torque in the range of ½-2 inch pounds and is rated at 850 milliamps at a pre-loaded speed of approximately 4500 RPM. It finds other uses of a less than heavy duty nature such as in electric knives.

A power extension cord 23 is provided for operating the motor 21 and for charging rechargeable batteries (not shown in FIGS. 1 or 10) which also excites the motor 21 during operation of the fish scaler.

A switch 24 is provided for coupling the rechargeable batteries to the motor 21. The switch 24 is counter-sunk into the housing 22 as a feature for preventing inadvertent actuation of the motor 21 when the fish scaler 10 is placed to rest on a supporting surface with the switch 24 adjacent the supporting surface; i.e., upside down.

The housing 22 defines an opening 25 into which the descaling tool 16 is inserted for communication with the motor. Annular structure 26 (FIG. 10) is inserted within the opening 25 and includes a bushing 26b for providing bearing support to the descaling tool 16 and a retainer 26a for providing a water tight seal between the housing 22 and the descaling tool 16. Because the descaling tool 16 is cantilevered from the housing 22, a considerable transverse force on the shank at the opening 25 may be developed due to the moment arm existing during operation of the fish scaler. The structure 26 minimizes the effects of the moment arm. Preferably the bushing 26b is made of Teflon.

As another feature of the invention, a speed reducer 28 is (as schematically illustrated) positioned within the motor housing 22. It couples the descaling tool 16 to the motor for reducing the rotational speed of the descaling tool 16 to a value less than the rotational speed of the motor. The speed reducer 28 may take the form of a gear reduction assembly of any suitable arrangement. As shown the speed reducer 28 includes a set of gears 29a-29d, wherein a relatively small drive gear 29b coupled to the armature of the motor 21 drives a relatively large gear 29a. The gear 29a is on a shaft in common with a relatively small gear 29c which drives a relatively larger gear 29d. The gear 29d is coupled to the descaling tool 16.

The speed reducer 28 is a feature of the invention which allows a relatively light weight, high speed motor to be utilized for rotating the descaling tool 16 at the desired, sufficiently low speed. In the preferred embodiment, the speed reducer 28, the speed at which the motor is driven, and the dimensions of the tool 16 are selected such that the cutting or scraping edges of the descaling tool 16 rotate within a range of 360 – 4800 inches per minute. For the nominal speed of 4200 inches per second and a tool 16 diameter of ⅞ inch, the reducer 28 is selected to rotate the tool 16 at approximately 1500 RPM. Although the invention suitably operates at speeds outside the stated range, this range is preferred.

Because it allows use of a high RPM, low torque motor the speed reducer 28 also is a safety proving feature. Low RPM, high torque motors draw relatively high, oftentimes dangerous, amounts of electrical current. By obviating the need for such a high torque motor the reducer 28 eliminates the otherwise risk of harm to the user.

As another feature of the invention, a shield 30 is secured to the housing 22 and extends therefrom in an overlying, spaced relationship with the descaling tool 16. The shield 30 is positioned for deflecting scales removed from the fish 12 and for preventing the removed scales from flying into the person of the user. The shield 30 is spaced a sufficient distance from the descaling tool 16 to assure that removed scales do not become clogged between the shield and the tool 16. The shield 30 is preferably comprised of a clear plastic material, but any such substantially transparent material which will allow viewing of the tool 16 and yet deflect the removed scales will suffice.

Figure 2:
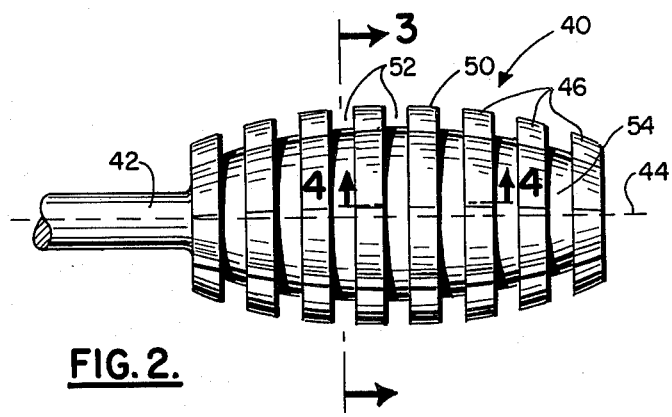
FIG. 2 is a side view of a descaling tool utilized in the fish scaler of FIG. 1.

Referring now to FIG. 2, the descaling tool 16 includes a teeth defining member 40 and a shank 42. The shank 42 is integrally secured to the member 40 and is adapted for positioning within the bearing and sealing structure 26 for communication with the speed reducer 28. The member 40 and the shank 42 are symmetrical about an axis 44. The member 40 defines circumferential rows 46 of teeth 48 having edges 50 (see FIGS. 3-7) about the axis 44 such that upon rotation of the tool 16 the rotating edges 50 define circles centered on the axis 44. In the illustrated embodiment, the diameter of the descaling tool at the longest radii is approximately ¾ - ⅞ inches.

Figure 8:
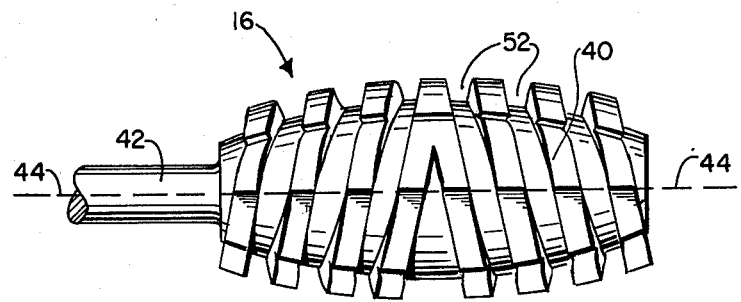
FIGS. 8, 9 and 11 are alternative embodiments of the descaling tool.
Figure 11:
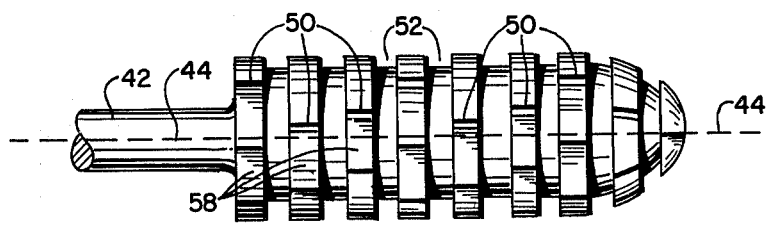

According to an outstanding feature of the invention, the circles corresponding to adjacent rows 46 are of different radii along at least a portion of the axis 44. Such circles of differing radii provide an outer periphery of cutting or scraping edges in an oval shape along at least a portion of the axis 44. FIG. 11 shows one embodiment whereby the oval portion is only along the end of the descaling tool 16 while FIGS. 2 and 8 show embodiments wherein the entire length along the axis 44 of the member 40 is oval.

As can be seen in FIG. 2, adjacent ones of the rows 46 are separated by spaces 52 which allow for the scales of the fish to be scattered without becoming clogged.

Preferably the member 40 is formed by a grinding process which cuts the circumferential spaces 52 into an oval shaped stock material of the proper dimensions to form an inner support structure 54. Although the inner support structure may be hollow, it preferably is a solid.

Figure 5:
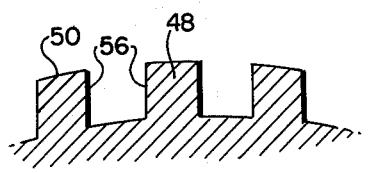
FIGS. 5-7 are cross sectional edge views of the scraping edge providing teeth on the descaling tool of FIG. 2.
Figure 6:
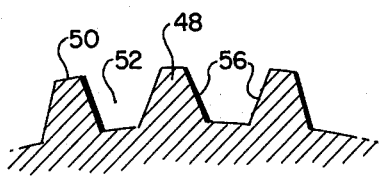
Figure 7:
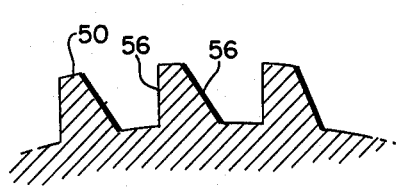

The cutting process which forms the spaces 52 may be selected to provide spaces configured according to FIG. 5-7. In FIG. 5 the cutting is such to provide each of the teeth 48 with substantially parallel side walls 56. In FIG. 6 the cutting provides each of the teeth 48 with non-parallel side walls, providing a trapezoidal shaped tooth having side walls 56 generally equal in length. FIG. 7 shows a tooth formed by the cutting process such that one of the side walls 56 is generally perpendicular to the axis 44, and the other of the side walls 56 is transverse to the axis 44.

The tooth configuration shown in FIG. 6 is the preferred embodiment, having its cutting edges 50 arranged in an oval shape and having non-parallel side walls 56 formed of generally equal lengths. This design minimizes the horsepower drawn from the motor 21 by reducing the area of the surface contact of the edges 50 with the fish, and at the same time provides an increased space 52 for allowing passage of the removed scales.

Figure 3:
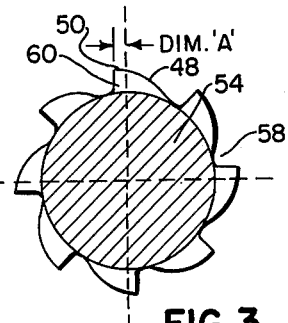
FIGS. 3 and 4 are cross sectional end views of two embodiments of the descaling tool shown in FIG. 2.
Figure 4:
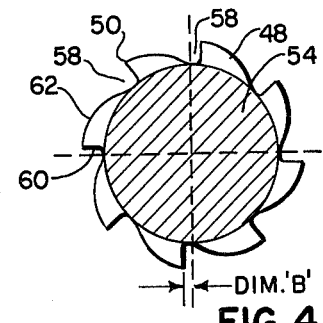

Referring now to FIGS. 3 and 4, after the spaces 52 have been formed, longitudinal slots 58 are ground transversely of the spaces 52, thereby forming the teeth 48. The radial elevation of the edges 50 (i.e., the dimensions of the teeth 48) and the dimensions of the support structure 54 are selected according to the RPM of the motor 21 and to the specifications of the speed reducer 28. Preferably the surface speed of the center-most row 46 is within the range of 3600-4800 inches per minute, and the dimensions of the descaling tool 16 and the RPM characteristics of the motor and speed reducer are chosen accordingly.

FIGS. 3 and 4 show cross sectional views down the axis 44 of the descaling tool 16. In these embodiments, the cutting process which formed the longitudinal slots 58 is such that the front walls 60 which are formed are not lying along a radius of the axis 44. The front walls 60 lie in planes parallel to radial planes.

The embodiment of FIG. 3 shows the front walls 60, when perpendicular to the fish, lying to the left of verticle on the top of the tool 16. The amount that the front wall 60 is off vertical is denoted in FIG. 3 as Dim. A.

This configuration defines a negative rake and is advantageous when using relatively heavy descaling tools in a mass, high volume process. With this embodiment, less scraping is achieved with the same amount of utilized horsepower than in the embodiment shown in FIG. 4.

In the embodiment shown in FIG. 4, the cutting process which formed the slots 58 is such that the front walls 60, when perpendicular to the fish, are to the right of verticle on the top of the tool 16. The amount that the front wall 60 is off vertical is denoted in FIG. 4 as Dim. B. This configuration defines a positive rake and is advantageous when using lighter weight descaling tools, wherein more bite per revolution is achieved. Although this embodiment requires more horsepower drawn from the motor 21 for a given bite, the lightweight and easily maneuverable tool allows the amount of drag placed on the cutting tool via the moment arm to be easily controlled to not overwork the motor.

Figure 9:
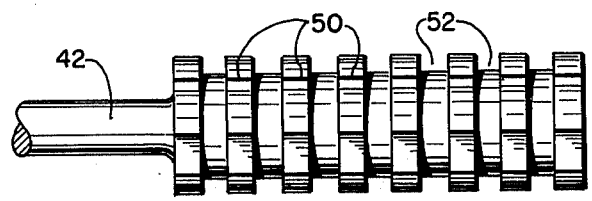

Although either the positive or the negative rake, or even a zero rake configuration is operable, the negative rake is preferred for the type of fish scaling operation depicted in FIG. 1. FIG. 9 indicates that a non-oval tool 16 having a positive or a negative rake may also be utilized according to the invention.

Referring now to FIG. 8, another embodiment of the descaling tool 16 is shown. In this embodiment, the cutting process which forms the spaces 52 is such that the circumferential rows 46 of teeth are spiralled. The rows 46 are spiralled in one direction at one end of the tool 16 and are spiralled in the other direction at the other end of the tool 16. This opposed spiral configuration causes passage of the removed scales along the axis 44, providing an effective sweeping motion for clearing the scales. The rake of this embodiment may be either positive or negative as above explained.

Referring now to FIG. 11, still another embodiment of the descaling tool 16 is shown. In this embodiment the slots 58 are formed by the cutting process in planes which are not coextensive with the axis 44. For example, the slots 58 may describe a sine wave or a square wave type configuration, or they may describe a sawtooth type wave configuration as shown. In FIG. 11 the configuration consists of a cutting which provides rows of edges formed by the slots 58 increasing in elevation as the extreme end of the tool 16 is approached. The inverse of this configuration, with the increase in elevation increasing toward the shank 42, is also suitable according to this aspect of the invention.

It will thus be appreciated that an improved, hand-held, powered fish scaler has been described. Efficient operation is achieved by a tool which is also economically manufactured and safe to use.

Although rather specific embodiments have been shown, it is understood that they have been by way of example only. Various modifications to the structures shown and to the operating perameters described will be apparent to those of ordinary skill in the art without departing from either the spirit or scope of the invention.

What is claimed is:

1. A hand-held, electrically operated fish scaler comprising:

(a) An electric motor for providing rotary motion, the motor being configured for hand-held operations;

(b) a housing for said motor;

(c) a switch for actuating said motor, said switch being configured in association with said housing for preventing inadvertent actuation thereof;

(d) a descaling tool rotated by the motor for engaging the scales of a fish, the descaling tool including a shank and a teeth defining member secured to the shank, the shank extending through an opening in the housing and removeably secured to the motor for rotation about the axis of the shank, and the member providing rows of teeth circumferential of said axis to thereby provide rows of cutting edges;

(e) one of said rows disposed substantially at the end of the teeth defining member opposite the shank, adjacent rows of edges at different radii from said axis to provide an oval periphery of cutting edges, adjacent teeth in the rows separated by longitudinal slots and adjacent rows separated by transverse grooves having groove bottoms shaped substantially in said oval configuration, the adjacent grooves having their respective bottoms at different radii from said axis;

(f) each said tooth being defined by a front wall, a rear wall, an upper surface, and a pair of side walls, said front walls of the teeth lying in non-radial planes with respect to said axis, thereby providing either negative or positive rake;

(g) annular structure secured to the housing and disposed within said opening for providing bearing support to said shank and for maintaining a seal between the housing and the shank; and (h) a substantially transparent shield fixedly disposed with respect to the source of power and adjacent said descaling tool for deflecting scales during operation of the fish scaler.

* * * * *